United States Patent
Täuber et al.

(10) Patent No.: US 10,450,010 B2
(45) Date of Patent: Oct. 22, 2019

(54) CAB SUSPENSION FOR A TILTABLE CAB OF A COMMERCIAL VEHICLE

(71) Applicant: MAN Truck & Bus Österreich GesmbH, Steyr (AT)

(72) Inventors: Klemens Täuber, Steyr (AT); Martin Moser, Steyr (AT); Rudolf Bramberger, Behamberg (AT)

(73) Assignee: MAN TRUCK & BUS ÖSTERREICH GESMBH, Steyr (AT)

( * ) Notice: Subject to any disclaimer, the term of this patent is extended or adjusted under 35 U.S.C. 154(b) by 174 days.

(21) Appl. No.: 15/650,461

(22) Filed: Jul. 14, 2017

(65) Prior Publication Data
US 2018/0022401 A1 Jan. 25, 2018

(30) Foreign Application Priority Data
Jul. 19, 2016 (AT) .................................. A 343/2016

(51) Int. Cl.
*B62D 33/063* (2006.01)
*B62D 33/06* (2006.01)
*B62D 33/067* (2006.01)

(52) U.S. Cl.
CPC ....... *B62D 33/0604* (2013.01); *B62D 33/067* (2013.01); *B62D 33/06* (2013.01)

(58) Field of Classification Search
CPC ... B62D 33/067; B62D 33/0604; B62D 33/06
(Continued)

(56) References Cited

U.S. PATENT DOCUMENTS 3,667,565 A * 6/1972 Steiner ............... B62D 33/0604
180/89.1
3,948,341 A * 4/1976 Foster ................... B62D 33/07
180/89.15
(Continued)

FOREIGN PATENT DOCUMENTS

DE 10037889 C1 2/2002
EP 0972698 B1 12/2004
(Continued)

OTHER PUBLICATIONS

European Search Report dated Jan. 18, 2018 in corresponding Application No. 17180073.3, 5 pages.
(Continued)

*Primary Examiner* — Toan C To
(74) *Attorney, Agent, or Firm* — Weber Rosselli & Cannon LLP

(57) ABSTRACT

The present disclosure relates to a cab suspension for a tiltable cab of a commercial vehicle, preferably a front cab-suspension. The cab suspension includes two brackets for mounting on a frame construction of the commercial vehicle in a manner fixed to the frame, a vibration construction for damping movements of the cab while the commercial vehicle is travelling, wherein the vibration construction has two lateral bearing portions and a cross-element connecting the bearing portions, and a torsion-bar construction for tilting the cab. The cab suspension is particularly notable in that the brackets have a ramp structure along which the vibration construction may be guided backwards and upwards in the event of a frontal collision and/or the vibration construction and the torsion-bar construction are functionally separate from one another.

15 Claims, 4 Drawing Sheets

(58) Field of Classification Search
USPC .............................. 180/89.12, 89.13, 89.14
See application file for complete search history.

(56) References Cited

U.S. PATENT DOCUMENTS

| | | | | |
|---|---|---|---|---|
| 4,451,079 A * | 5/1984 | Takahashi | ............ | B62D 33/067 180/89.13 |
| 5,209,316 A * | 5/1993 | Bauer | ................ | B62D 33/0608 180/89.14 |
| 5,906,248 A | 5/1999 | Nagaike et al. | | |
| 5,967,597 A * | 10/1999 | Vander Kooi | ....... | B60G 99/004 180/89.13 |
| 6,540,038 B2 * | 4/2003 | Taylor | ................ | B62D 33/0608 180/89.13 |
| 7,232,180 B2 * | 6/2007 | Biasiotto | ............ | B62D 33/0604 180/89.14 |
| 9,180,918 B2 * | 11/2015 | Oh | ....................... | B62D 33/067 |
| 2003/0146647 A1 * | 8/2003 | Leitner | ................ | B60G 99/004 296/190.05 |
| 2008/0106122 A1 * | 5/2008 | Grimes | ................ | B62D 33/067 296/190.05 |
| 2011/0266727 A1 * | 11/2011 | Knevels | ............ | B62D 33/0608 267/64.24 |
| 2014/0367995 A1 | 12/2014 | Oh et al. | | |

FOREIGN PATENT DOCUMENTS

| | | |
|---|---|---|
| EP | 1690781 A2 | 8/2006 |
| WO | 2007/012394 A1 | 2/2007 |
| WO | 2011/139532 A2 | 11/2011 |

OTHER PUBLICATIONS

Australian Search Report issued in corresponding Australian application No. A 343/2016 dated Feb. 15, 2017, 1 page.

* cited by examiner

CAB SUSPENSION FOR A TILTABLE CAB OF A COMMERCIAL VEHICLE

BACKGROUND

1. Technical Field

The present disclosure relates to a cab suspension for a tiltable cab of a commercial vehicle, in particular a front cab-suspension for a tiltable cab of a heavy goods vehicle.

2. Description of Related Art

A front cab-suspension for a tiltable cab of a commercial vehicle is already known from EP 1 690 781 A2. Such cab suspensions conventionally comprise a vibration construction for damping movements of the cab whilst the commercial vehicle is travelling and a torsion-bar construction for manually actuated tilting of the cab. A disadvantage of such cab suspensions is that the vibration function and the torsion-bar function influence one another, in particular with regard to their bearing arrangements. Another disadvantage is that the engine of the commercial vehicle tends to penetrate into the cab in the event of a frontal collision.

SUMMARY

An object of the present disclosure is to provide an improved and/or alternative cab suspension for a tiltable cab.

The present disclosure preferably provides a front cab-suspension for a tiltable cab of a commercial vehicle, e.g. a heavy goods vehicle. The cab is expediently tiltable using manual force.

The cab has two brackets for mounting on a frame construction of the commercial vehicle in a manner fixed to the frame, in particular fixed to the cross-member. The frame construction expediently comprises at least one cross-member and two side-members.

The cab suspension furthermore comprises a vibration construction for damping movements of the cab whilst the commercial vehicle is travelling and a torsion-bar construction for tilting the cab, in particular using manual force.

The vibration construction can preferably have two lateral bearing portions, e.g. in the form of bearing blocks, and a cross-element, e.g. a hollow profile element, connecting the bearing portions.

The torsion-bar construction is preferably designed to be substantially U-shaped, which can be realized for example by a single-part, substantially U-shaped, torsion-bar structure or for example by two substantially L-shaped torsion-bar structures.

The cab suspension is particularly notable in that the brackets have a ramp structure along which the vibration construction can be expediently guided backwards and/or upwards in the event of a frontal collision (e.g. a frontal impact) so that the risk of an engine of a commercial vehicle penetrating into the cab floor can be prevented or at least reduced.

Alternatively or additionally, the cab suspension is particularly notable in that the vibration construction and the torsion-bar construction are functionally separate from one another.

It is possible that the vibration construction and the torsion-bar construction are supported by means of mutually separate bearing arrangements and/or are separate from one another as a result of being constructed as mutually separate component units to expediently enable the functional separation.

It is possible that the torsion-bar construction is for example rotatably mounted on the brackets so that the brackets serve as a bearing arrangement for the torsion-bar construction.

The brackets can each be provided with a pre-tensioning device for pre-tensioning the torsion-bar construction.

The bearing portions of the vibration construction can be supported for example by means of deformation bearings, in particular at the front, so that the deformation bearings serve as a bearing arrangement for the vibration construction. The deformation bearings can be expediently constructed as suspension strut bearings, elastomeric bearings, pot bearings and/or spherical bearings.

The bearing portions can be supported for example on side-members of the frame construction of the commercial vehicle at the back, for example the bearing portions can lie on said side-members.

In particular, the deformation bearings do not serve to support the torsion-bar construction, which means the deformation bearings are preferably at least substantially insulated from loads of the torsion-bar construction.

The deformation bearings can be guided for example through through-openings in the brackets and/or be supported for example directly with their lower side below the brackets. The through-openings are preferably formed in expediently substantially horizontal sections of the brackets.

It is possible that the deformation bearings are moved (drawn) out of the through-openings in the brackets, expediently substantially upwards, in the event of a frontal collision.

The cab suspension can have two bearing blocks for rotatable mounting of the cab. The bearing blocks can be for example rotatably mounted on the bearing portions of the vibration construction so that they are rotatable for example relative to the bearing portions of the vibration construction.

The bearing portions of the vibration construction expediently each comprise two substantially upwardly projecting mounting portions.

The bearing blocks for rotatable mounting of the cab can preferably each be rotatably supported on and/or between the two mounting portions.

It is possible that the torsion-bar construction is rotatable about at least one first axis, the bearing portions of the vibration construction are rotatable about a second axis of rotation and/or the two bearing blocks for rotatable mounting of the cab are rotatable about a third axis of rotation.

The at least one first axis of rotation, the second axis of rotation and/or the third axis of rotation are preferably spaced from one another and/or extend substantially parallel to one another.

It is possible in particular that the cross-element of the vibration construction may be expediently guided upwards and/or backwards along the ramp structure in the event of a frontal collision. In particular, the cross-element of the vibration construction impacts against the ramp structure in the event of a frontal collision.

The brackets can for example each have an upwardly projecting section and preferably a substantially horizontal section.

The ramp structure can be formed for example by end faces of the upwardly projecting sections, the two bearing portions of the vibration construction can each be arranged for example laterally outside the upwardly projecting sections and/or the two bearing blocks can each be arranged for example laterally outside the upwardly projecting sections.

It is possible that the brackets are mounted on a cross-member of the frame construction. Alternatively or additionally, the deformation bearings can be supported on bearing structures formed on the cross-member, e.g. holding flanges, holding brackets, holding projections, holding notches etc., which can preferably be formed below the brackets. The bearing structures can protrude from the cross-member, for example, or be integrated therein.

The cab may be expediently positioned on the cab suspension in the tilted position and in the driving position, which may be realized in particular in that the torsion-bar construction, in particular its two stabilizers, may be rotated upwards to a stop (tilted position) by the pre-tensioning device or are only pre-tensioned once the cab is in a level position.

The bearing portions of the vibration construction and/or the bearing blocks for mounting the cab can preferably comprise supporting constructions extending substantially in the longitudinal direction of the commercial vehicle.

It should again be mentioned that the torsion-bar construction can expediently be formed to be substantially U-shaped in a single part or in two parts by means of two substantially L-shaped torsion-bar structures.

It should moreover be mentioned that multi-axial loads on the deformation bearing can preferably be prevented by means of the cab suspension.

It should furthermore be mentioned that the torsion-bar construction can be constructed from preferably one or more bar profiles, in particular hollow or. The latter likewise expediently applies to the cross-element of the vibration construction.

The present disclosure not only comprises a cab suspension as described herein but also a cab for a commercial vehicle, in particular an HGV, which is equipped with such a cab suspension.

The preferred embodiments and features of the present disclosure described above may be combined with one another. Other advantageous further developments of the present disclosure are revealed in the description below of preferred embodiments of the present disclosure in conjunction with the accompanying figures.

DETAILED DESCRIPTION

Figure 1:
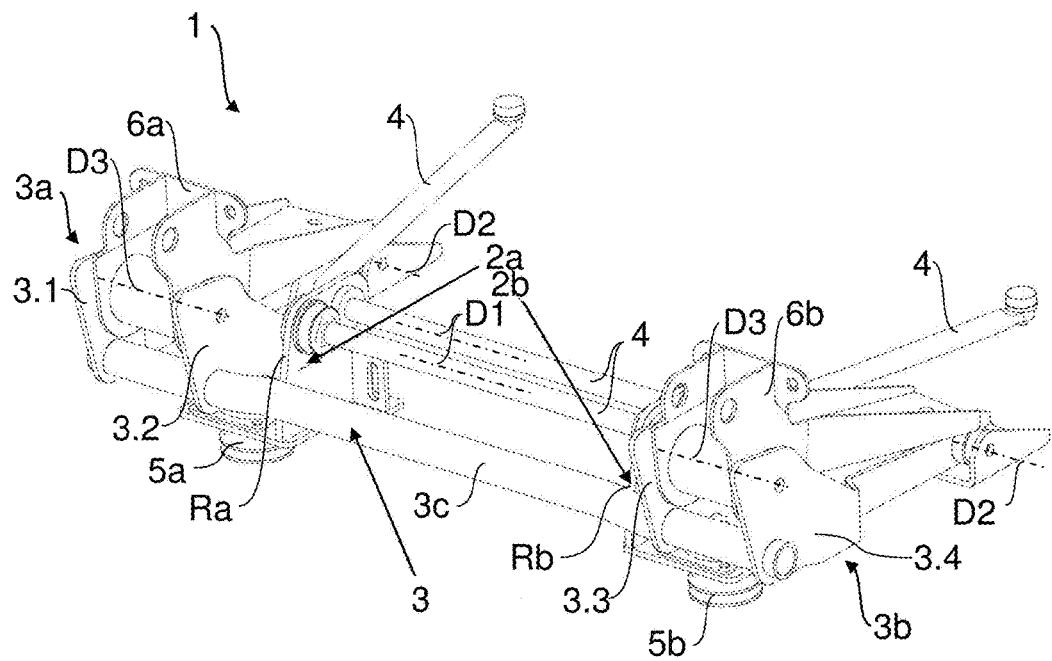
FIG. 1 shows a perspective view of a cab suspension according to an embodiment of the present disclosure.
Figure 7:
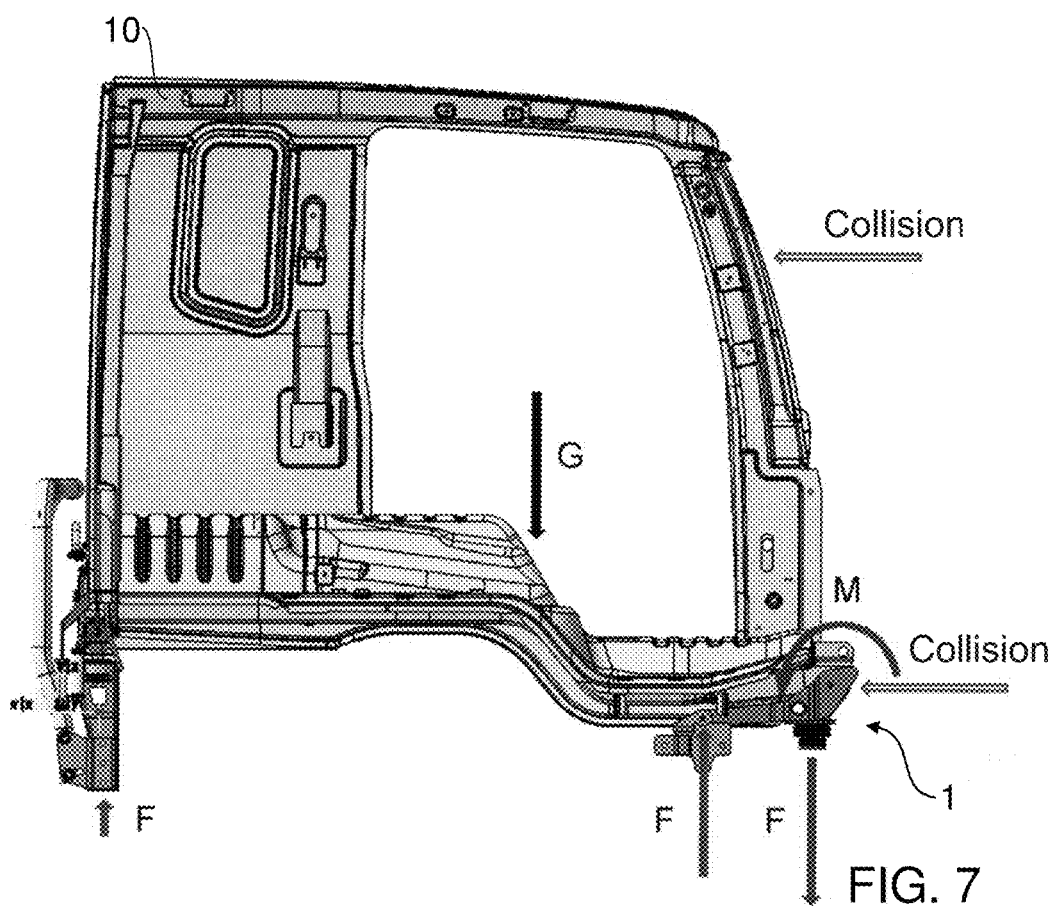
FIG. 7 shows a side view of a cab according to an embodiment of the present disclosure.

FIG. 1 shows a perspective view of a cab suspension 1 for a cab 10 of a commercial vehicle, in particular a heavy goods vehicle, which cab may be tilted using manual force (see FIG. 7). The cab suspension 1 is constructed in particular as a front cab-suspension.

The cab suspension 1 comprises two brackets 2a and 2a for mounting on a frame construction, in particular a chassis construction, of the commercial vehicle in a manner fixed to the frame, which frame construction has at least one cross-member and two side-members. The brackets 2a, 2b serve in particular for mounting on a cross-beam of the frame construction.

A vibration construction 3 serves for damping movements of the vehicle 10 (e.g. pitching, yawing and/or rolling) whilst the commercial vehicle is travelling. The vibration construction 3 comprises two lateral bearing portions 3a and 3b, for example in the form of bearing blocks, and a cross-element 3c, e.g. a circular tube, connecting the two bearing portions 3a, 3b. The bearing portions 3a, 3b comprise supporting constructions in the longitudinal direction of the commercial vehicle.

A torsion-bar construction 4 serves for tilting the cab 10 using manual force. In FIG. 1, the torsion-bar construction 4 is constructed from two substantially L-shaped torsion-bar structures which form a substantial U shape. However, it is likewise possible within the scope of the present disclosure to use a single-part, preferably likewise substantially U-shaped torsion-bar construction instead of the two-part torsion-bar construction in FIG. 1. The torsion-bar construction 4 is rotatably mounted on the brackets 2a, 2b so that the brackets 2a, 2b serve as a bearing arrangement for the torsion-bar construction 4. The brackets 2a, 2b each comprise a pre-tensioning device 7 (e.g. FIG. 4) for pre-tensioning the torsion-bar construction 4, which enables the tilting of the cab 10 using manual force or at least assists with this.

The brackets 2a, 2b have a ramp structure Ra and Rb. In the event of a frontal collision of the commercial vehicle, the vibration construction 3 can be pushed expediently backwards and upwards along the ramp structure Ra, Rb, in particular by means of the cross-element 3c, whereby the risk of the engine of the commercial vehicle penetrating into the cab floor may be reduced or even completely prevented.

The bearing portions 3a, 3b of the vibration construction 3 are expediently supported at the front by means of deformation bearings 5a, 5b constructed for example as elastomeric bearings/pot bearings, although the deformation bearings 5a, 5b can also be constructed as suspension strut bearings. The deformation bearings 5a, 5b therefore serve as a bearing arrangement for the vibration construction 3.

The torsion-bar construction 4, on the other hand, is not supported by means of the deformation bearings 5a, 5b but by means of the brackets 2a, 2b. It is thereby possible to ensure that the deformation bearings 5b, 5b are substantially insulated from loads of the torsion-bar construction 4 so that the deformation bearings 5a, 5b are expediently acted upon at least virtually exclusively by substantially vertical loads from the vibration construction 3 and an undesired multi-axial load thereof can therefore preferably be at least substantially prevented.

Figure 2:
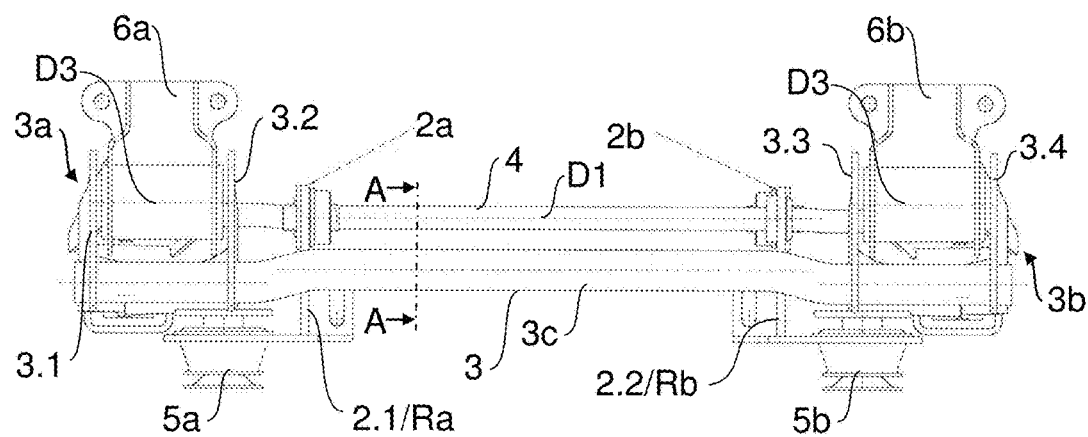
FIG. 2 shows a front view of the cab suspension of FIG. 1.

The brackets 2a, 2b preferably comprise a substantially horizontal section in each case and an upwardly projecting section 2.1 and 2.2 in each case (see FIG. 2). The deformation bearings 5a, 5b are guided in particular through through-openings in the brackets 2a, 2b, in particular through the substantially horizontal sections of the brackets 2a, 2b, and are expediently urged out of these in the event of a frontal collision.

The cab suspension 1 furthermore comprises two bearing blocks 6a and 6b which serve for rotatably mounting the cab 1 and which are rotatably mounted on the bearing portions 3a, 3b of the vibration construction 3 so that the two bearing blocks 6a, 6b are rotatable relative to the bearing portions 3a, 3b of the vibration construction 3.

The bearing portions 3a, 3b of the vibration construction 3 each comprise two upwardly projecting mounting portions 3.1 and 3.2 on the one hand and 3.3 and 3.4 on the other. The bearing blocks 6a, 6b are each rotatably mounted on and/or between the two mounting portions 3.1, 3.2 and 3.3, 3.4. The bearing portions 3a, 3b of the vibration construction 3 and the bearing blocks 6a, 6b comprise supporting constructions extending substantially in the longitudinal direction of the commercial vehicle.

The rear torsion-bar structure in FIG. 1 and the front torsion-bar structure in FIG. 1 of the torsion-bar construction 4 are rotatable about two substantially parallel-extending axes of rotation, which are together denoted by the reference sign D1. In a single-part construction of the torsion-bar construction 4, only one axis of rotation D1 would expediently be present. The bearing portions 3a, 3b of the vibration construction 3 are rotatable about an axis of rotation D2.

The two bearing blocks 6A, 6B are rotatable about an axis of rotation D3. The axes of rotation D1, the axis of rotation D2 and the axis of rotation D3 are expediently spaced from another and extend substantially parallel to one another. The vibration construction 3 and the torsion-bar construction 4 are functionally separate from one another. Therefore, the vibration construction 3 and the torsion-bar construction 4 are in particular constructed as mutually separate, independent component units and additionally supported on mutually separate bearing arrangements (2a, 2b; 5a, 5b).

FIG. 2 shows a front view of the cab suspension 1 of FIG. 1. It can be seen from FIG. 2 in particular that the bracket 2a comprises the upwardly projecting section 2.1 having the ramp structure Ra and the bracket 2b comprises the upwardly projecting section 2.2 having the ramp structure 2b.

The two bearing portions 3a, 3b of the vibration construction 3 as well as the two bearing blocks 6b, 6b are expediently each arranged laterally outside the two sections 2.1, 2.2. The brackets 2a, 2b are expediently provided to be mounted with their lower sides on a cross-member of the frame construction (not shown). The deformation bearings 5b, 5b are provided to be expediently supported on bearing structures (not shown) formed on the cross-member, for example on holding projections borne on the cross-member.

Figure 3:
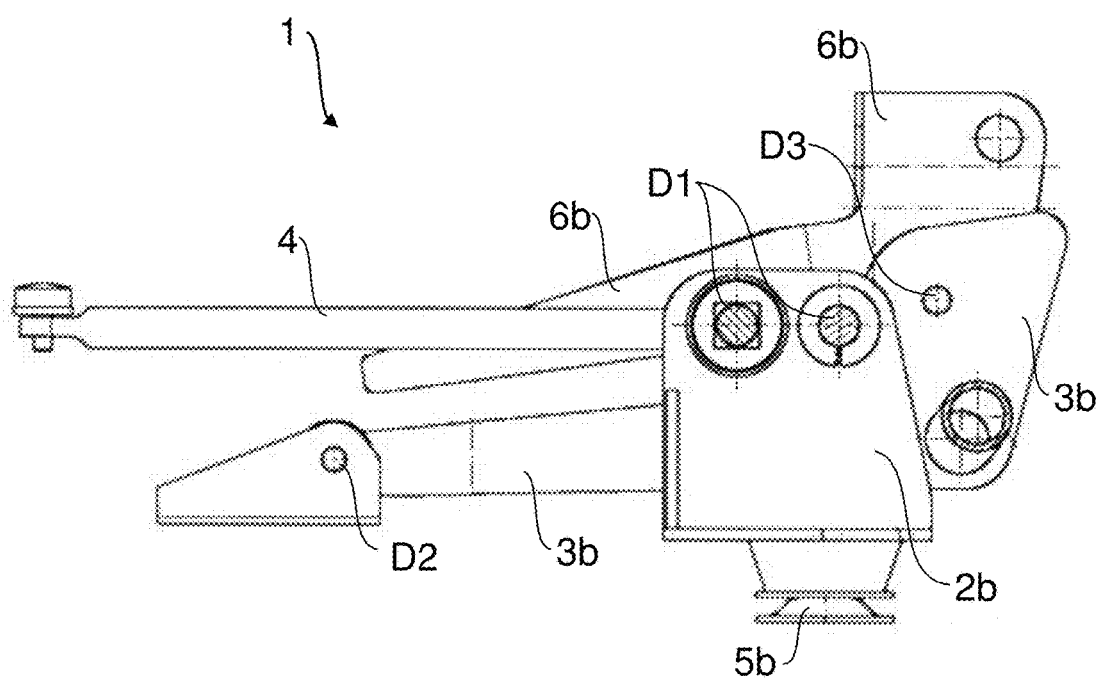
FIG. 3 shows a sectional view along section A-A of FIG. 2.
Figure 4:
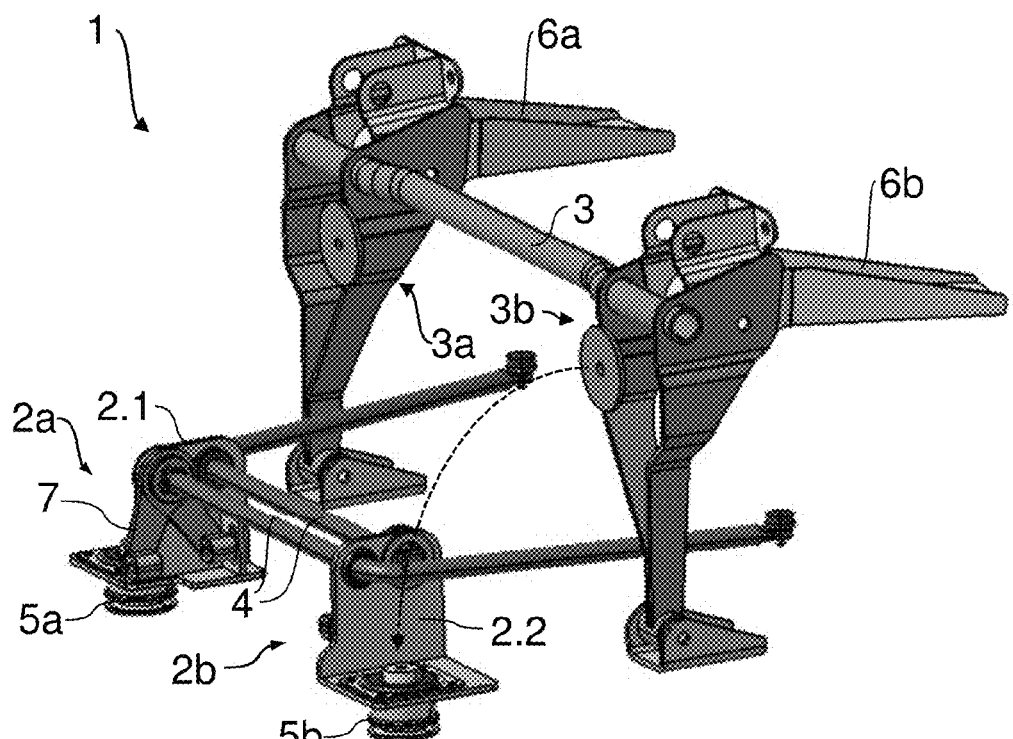
FIGS. 4 to 6 illustrate a procedure for placing the vibration construction on the torsion-bar construction, in particular on deformation bearings, according to an embodiment of the present disclosure.
Figure 5:
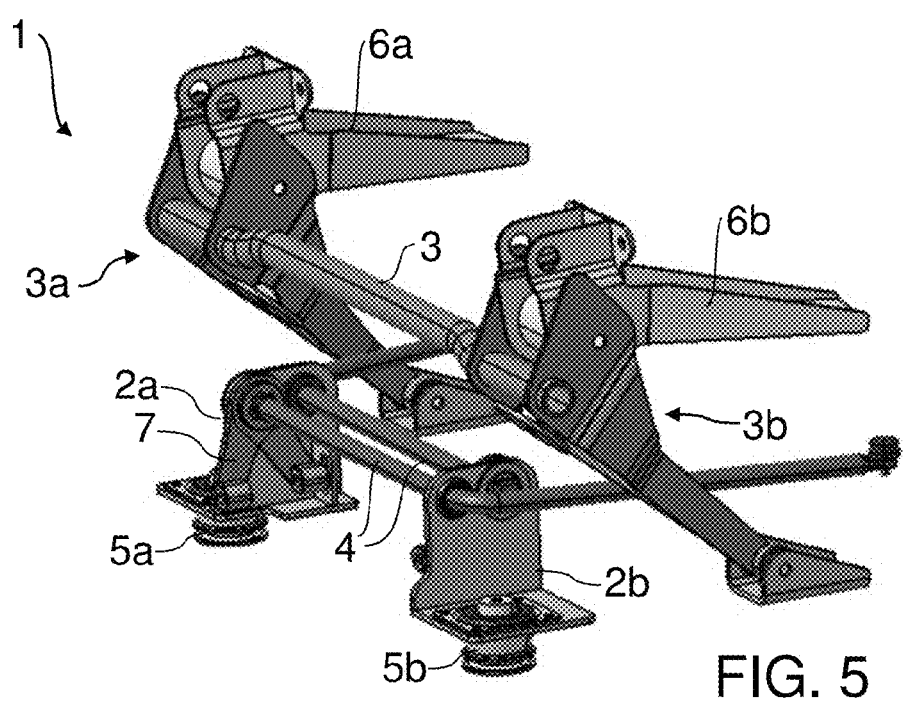
Figure 6:
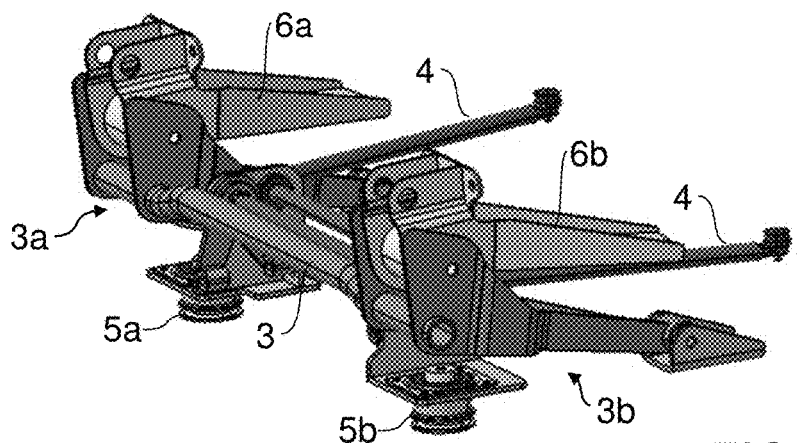

FIG. 3 shows a side view of the cab suspension 1 according to section A-A of FIG. 2. FIGS. 4 to 6 illustrate a procedure for placing the vibration construction 3 on the torsion-bar construction 4, in particular on the deformation bearings 5a, 5b according to an embodiment of the present disclosure.

FIGS. 4 to 6 moreover show the pre-tensioning device 7 provided on the bracket 2a for pre-tensioning the torsion-bar construction 4, which can expediently be identically realized on the bracket 2b. It is shown in FIGS. 4 to 6 that the cab 10 may be positioned on the cab suspension 1 in the tilted position and in the driving position, which may be realized in particular in that the two stabilizers 4 (torsion-bar construction) are rotated upwards to a stop (tilted position) by the pre-tensioning device 7 or are only pre-tensioned once the cab 10 is in a level position.

FIG. 7 shows a side view of a cab 10 having a cab suspension 1 as described herein and a load and moment stress occurring in the event of a frontal collision of the commercial vehicle.

The present disclosure is not restricted to the preferred embodiments described above. Instead, a plurality of variants and modifications is possible, which likewise make use of the inventive idea and therefore fall within the scope of protection. The present disclosure moreover also claims protection for the subject matter and features of the sub-claims independently of the features and claims to which they refer.

LIST OF REFERENCE SIGNS

1 Cab suspension, in particular front cab-suspension
2a, 2b Brackets for mounting on a frame construction in a manner fixed to the frame
2.1, 2.2 Upwardly projecting section of the respective bracket
3 Vibration construction for damping movements of the cab whilst the commercial vehicle is travelling
3a, 3b Lateral bearing portions of the vibration construction
3c Cross-element of the vibration construction, connecting the two bearing portions
3.1, 3.2 Upwardly projecting mounting portion of one bearing portion
3.3, 3.4 Upwardly projecting mounting portion of the other bearing portion
4 Torsion-bar construction for tilting the cab
5a, 5b Deformation bearing
6a, 6b Bearing blocks for rotatable mounting of the cab
7 Pre-tensioning device
Ra, Rb Ramp structure on brackets
D1 At least one axis of rotation of the torsion-bar construction
D2 Axis of rotation of the bearing portions of the vibration construction
D3 Axis of rotation of the bearing blocks
10 Cab

The invention claimed is:

1. A cab suspension for a tiltable cab of a commercial vehicle comprising:
   two brackets for mounting on a frame construction of the commercial vehicle, in a manner fixed to the frame;
   a vibration construction for damping movements of the cab whilst the commercial vehicle is travelling, wherein the vibration construction has two lateral bearing portions and a cross-element connecting the bearing portions; and
   a torsion-bar construction for tilting the cab, wherein the brackets have a ramp structure along which the vibration construction is guided backwards and upwards in the event of a frontal collision, or the vibration construction and the torsion-bar construction are functionally separate from one another, wherein the brackets are each provided with a pre-tensioning device for pre-tensioning the torsion-bar construction.

2. The cab suspension according to claim 1, wherein the two brackets are mounted on a cross-member of the frame construction.

3. The cab suspension according to claim 1, wherein the vibration construction and the torsion-bar construction are supported by means of mutually separate bearing arrangements or are separate from one another as a result of being constructed as mutually separate component units.

4. The cab suspension according to claim 1, wherein the torsion-bar construction is rotatably mounted on the brackets so that the brackets serve as a bearing arrangement for the torsion-bar construction.

5. The cab suspension according to claim 1, wherein the brackets are mounted on a cross-member of the frame construction or the deformation bearings are mounted on bearing structures formed on the cross-member.

6. The cab suspension according to claim 1, wherein the cab is positioned on the cab suspension in a tilted position and in a driving position.

7. A cab suspension for a tiltable cab of a commercial vehicle comprising:
two brackets for mounting on a frame construction of the commercial vehicle, in a manner fixed to the frame;
a vibration construction for damping movements of the cab whilst the commercial vehicle is travelling, wherein the vibration construction has two lateral bearing portions and a cross-element connecting the bearing portions; and
a torsion-bar construction for tilting the cab, wherein the brackets have a ramp structure along which the vibration construction is guided backwards and upwards in the event of a frontal collision, or the vibration construction and the torsion-bar construction are functionally separate from one another, wherein the bearing portions of the vibration construction are supported by deformation bearings which serve as a bearing arrangement for the vibration construction.

8. The cab suspension according to claim 7, wherein the deformation bearings are selected from the group consisting of strut bearings, elastomeric bearings, pot bearings, spherical bearings, and combination thereof.

9. The cab suspension according to claim 7, wherein the deformation bearings are guided through through-openings in the brackets or expediently supported directly with their lower side below the brackets.

10. The cab suspension according to claim 9, wherein the deformation bearings are moved out of the through-openings in the brackets in the event of a frontal collision.

11. A cab suspension for a tiltable cab of a commercial vehicle comprising:
two brackets for mounting on a frame construction of the commercial vehicle, in a manner fixed to the frame;
a vibration construction for damping movements of the cab whilst the commercial vehicle is travelling, wherein the vibration construction has two lateral bearing portions and a cross-element connecting the bearing portions; and
a torsion-bar construction for tilting the cab, wherein the brackets have a ramp structure along which the vibration construction is guided backwards and upwards in the event of a frontal collision, or the vibration construction and the torsion-bar construction are functionally separate from one another, wherein the cab suspension has two bearing blocks for rotatable mounting of the cab and the bearing blocks are rotatably mounted on the bearing portions of the vibration construction so that they are rotatable relative to the bearing portions of the vibration construction.

12. A cab suspension for a tiltable cab of a commercial vehicle comprising:
two brackets for mounting on a frame construction of the commercial vehicle, in a manner fixed to the frame;
a vibration construction for damping movements of the cab whilst the commercial vehicle is travelling, wherein the vibration construction has two lateral bearing portions and a cross-element connecting the bearing portions; and
a torsion-bar construction for tilting the cab, wherein the brackets have a ramp structure along which the vibration construction is guided backwards and upwards in the event of a frontal collision, or the vibration construction and the torsion-bar construction are functionally separate from one another, wherein the bearing portions of the vibration construction each have two upwardly projecting mounting portions and bearing blocks for rotatable mounting of the cab are each rotatably supported on or between the two upwardly projecting mounting portions.

13. A cab suspension for a tiltable cab of a commercial vehicle comprising:
two brackets for mounting on a frame construction of the commercial vehicle, in a manner fixed to the frame;
a vibration construction for damping movements of the cab whilst the commercial vehicle is travelling, wherein the vibration construction has two lateral bearing portions and a cross-element connecting the bearing portions; and
a torsion-bar construction for tilting the cab, wherein the brackets have a ramp structure along which the vibration construction is guided backwards and upwards in the event of a frontal collision, or the vibration construction and the torsion-bar construction are functionally separate from one another, wherein the torsion-bar construction is rotatable about at least one first axis of rotation, the bearing portions of the vibration construction are rotatable about a second axis of rotation and the two bearing blocks for rotatable mounting of the cab are rotatable about a third axis of rotation and preferably the at least one first axis of rotation, the second axis of rotation and the third axis of rotation are spaced from one another and extend substantially parallel.

14. A cab suspension for a tiltable cab of a commercial vehicle comprising:
two brackets for mounting on a frame construction of the commercial vehicle, in a manner fixed to the frame;
a vibration construction for damping movements of the cab whilst the commercial vehicle is travelling, wherein the vibration construction has two lateral bearing portions and a cross-element connecting the bearing portions; and
a torsion-bar construction for tilting the cab, wherein the brackets have a ramp structure along which the vibration construction is guided backwards and upwards in the event of a frontal collision, or the vibration construction and the torsion-bar construction are functionally separate from one another, wherein the cross-element of the vibration construction is guided upwards along the ramp structure in the event of a frontal collision or the two bearing portions of the vibration construction are expediently supported on side-members of the frame construction of the commercial vehicle at the back.

15. A cab suspension for a tiltable cab of a commercial vehicle comprising:
two brackets for mounting on a frame construction of the commercial vehicle, in a manner fixed to the frame;
a vibration construction for damping movements of the cab whilst the commercial vehicle is travelling, wherein the vibration construction has two lateral bearing portions and a cross-element connecting the bearing portions; and
a torsion-bar construction for tilting the cab, wherein the brackets have a ramp structure along which the vibration construction is guided backwards and upwards in the event of a frontal collision, or the vibration construction and the torsion-bar construction are functionally separate from one another, wherein the brackets have a substantially horizontal section and an upwardly projecting section, and the ramp structure is formed by end faces of the upwardly projecting sections, the two bearing portions of the vibration construction are each arranged laterally outside the upwardly projecting sections, or two bearing blocks are each arranged laterally outside the upwardly projecting sections.

* * * * *